United States Patent
Wang et al.

(10) Patent No.: US 11,354,923 B2
(45) Date of Patent: Jun. 7, 2022

(54) HUMAN BODY RECOGNITION METHOD AND APPARATUS, AND STORAGE MEDIUM

(71) Applicant: BAIDU ONLINE NETWORK TECHNOLOGY (BEIJING) CO., LTD., Beijing (CN)

(72) Inventors: Jian Wang, Beijing (CN); Xubin Li, Beijing (CN); Le Kang, Beijing (CN); Zeyu Liu, Beijing (CN); Zhizhen Chi, Beijing (CN); Chengyue Zhang, Beijing (CN); Xiao Liu, Beijing (CN); Hao Sun, Beijing (CN); Shilei Wen, Beijing (CN); Yingze Bao, Beijing (CN); Mingyu Chen, Beijing (CN); Errui Ding, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/934,174

(22) Filed: Jul. 21, 2020

(65) Prior Publication Data
US 2020/0349349 A1 Nov. 5, 2020

Related U.S. Application Data

(63) Continuation of application No. PCT/CN2019/089969, filed on Jun. 4, 2019.

(30) Foreign Application Priority Data

Jul. 3, 2018 (CN) .......................... 201810719692.3

(51) Int. Cl.
*G06V 40/10* (2022.01)
*G06V 10/98* (2022.01)

(52) U.S. Cl.
CPC ............ *G06V 40/103* (2022.01); *G06V 10/98* (2022.01)

(58) Field of Classification Search
None
See application file for complete search history.

(56) References Cited

U.S. PATENT DOCUMENTS

| 8,948,461 | B1 * | 2/2015 | Broadhurst ........ G06K 9/00201 382/106 |
| 11,116,383 | B2 * | 9/2021 | Nir ..................... A61B 1/00006 |

(Continued)

FOREIGN PATENT DOCUMENTS

| CN | 102222348 A | 10/2011 |
| CN | 103810476 A | 5/2014 |

(Continued)

OTHER PUBLICATIONS

International Search Report and Written Opinion of the International Searching Authority, issued in PCT/CN2019/089969, dated Aug. 16, 2019; ISA/CN.

(Continued)

*Primary Examiner* — Santiago Garcia
(74) *Attorney, Agent, or Firm* — Harness, Dickey & Pierce, P.L.C.

(57) ABSTRACT

The present disclosure provides a human body recognition method and apparatus, and a storage medium, the method comprising: determining a coordinate of a target person in a three-dimensional space according to images containing the target person collected by at least two cameras; calculating back-projection errors of the target person under different cameras respectively according to the coordinate of the target person in the three-dimensional space; determining whether the cameras have a human body recognition error according to the back-projection errors of the cameras; when a camera has the human body recognition error, performing (Continued)

re-recognition of the target person under the camera by using person re-identification ReID, until the back-projection errors of all the cameras containing the target person are not greater than a preset threshold. The present disclosure can improve accuracy of the human body recognition result effectively.

11 Claims, 4 Drawing Sheets

(56) References Cited

U.S. PATENT DOCUMENTS

| | | | |
|---|---|---|---|
| 2006/0188131 A1 | 8/2006 | Zhang et al. | |
| 2013/0095920 A1* | 4/2013 | Patiejunas | G06T 17/20 |
| | | | 463/31 |
| 2014/0363048 A1 | 12/2014 | Vrcelji et al. | |
| 2017/0172382 A1* | 6/2017 | Nir | A61B 1/00045 |
| 2017/0178345 A1 | 6/2017 | Pham | |
| 2019/0139319 A1* | 5/2019 | Eisenmann | G06T 15/20 |
| 2019/0197770 A1* | 6/2019 | Chang | G01B 11/24 |
| 2019/0325209 A1* | 10/2019 | Liu | G06K 9/00369 |
| 2019/0364265 A1* | 11/2019 | Matsunobu | H04N 13/279 |
| 2020/0051258 A1* | 2/2020 | Miao | A61B 6/504 |
| 2020/0118264 A1* | 4/2020 | Harish | A61B 6/504 |

FOREIGN PATENT DOCUMENTS

| | | |
|---|---|---|
| CN | 104408436 A | 3/2015 |
| CN | 106203400 A | 12/2016 |
| CN | 109063567 A | 12/2018 |
| JP | 2003256848 A | 9/2003 |
| JP | 2016521892 A | 7/2016 |
| JP | 2016139949 A | 8/2016 |
| JP | 2017017441 A | 1/2017 |
| JP | 2017174105 A | 9/2017 |

OTHER PUBLICATIONS

Notice of Allowance of corresponding Chinese Patent Application (four pages).
Office Action for corresponding Japanese patent application No. 2020-526101 dated Jul. 27, 2021, four pages.
Office Action for corresponding Korean patent application No. 10-2020-7013408 dated Sep. 29, 2021, eight pages.
Extended European Search Report for corresponding European patent application No. 19830531.0 dated Mar. 31, 2022, eight pages.

* cited by examiner

HUMAN BODY RECOGNITION METHOD AND APPARATUS, AND STORAGE MEDIUM

CROSS-REFERENCE TO RELATED APPLICATIONS

This application is a continuation of International Application No. PCT/CN2019/089969, filed on Jun. 4, 2019, which claims priority to Chinese Patent Application No. 2018107196923, entitled "HUMAN BODY RECOGNITION METHOD AND APPARATUS, AND STORAGE MEDIUM" and filed on Jul. 3, 2018 to the National Intellectual Property Administration of China, the applicant being Baidu Online Network Technology (Beijing) Co. Ltd. Both of the aforementioned applications are hereby incorporated by reference in their entireties.

TECHNICAL FIELD

The present disclosure relates to the field of image recognition and, in particular, to a human body recognition method and apparatus and a storage medium.

BACKGROUND

With development of monitoring technology, more and more cameras are deployed, so that real-time tracking and recognition of a human body in a closed scene becomes possible.

Currently, multi-person tracking and recognition under multi-view mainly relies on information of two-dimensional images, which recognizes and correlates human bodies cross cameras by means of semantic features of the human bodies in the two-dimensional images.

However, there may be a large difference among the postures of a human body under multiple cameras, resulting in a large bias in visual features of the human body in the two-dimensional images. It also causes the cross-camera recognition through the information provided by the two-dimensional image to have a low accuracy and be prone to make a mistake in human body recognition.

SUMMARY

The present disclosure provides a human body recognition method and apparatus, and a storage medium, which can introduce the three-dimensional spatial coordinate of a human body into human body re-recognition technology to prejudge a recognition result of images, and re-recognize the images with a recognition error, thereby improving accuracy of the human body recognition result effectively.

In a first aspect, the present disclosure provides a human body recognition method, including:

determining a coordinate of a target person in a three-dimensional space according to images containing the target person collected by at least two cameras;

calculating back-projection errors of the target person under different cameras respectively according to the coordinate of the target person in the three-dimensional space;

for each camera, determining whether the camera has a human body recognition error according to a back-projection error of the camera;

performing re-recognition of the target person under the camera by using person re-identification ReID when the camera has the human body recognition error, until the back-projection errors of all the cameras containing the target person are not greater than a preset threshold.

In the embodiment, the three-dimensional spatial coordinate of the human body can be introduced into the human body re-recognition technology to prejudge the recognition result of the images and re-recognize the images with the recognition error, thereby effectively improving the accuracy of the human recognition result.

In a possible design, before determining the coordinate of the target person in the three-dimensional space according to the images containing the target person collected by at least two cameras, further include:

performing human body recognition on images collected by multiple cameras in a scene by using the person re-identification ReID, to obtain a corresponding relationship of the target person under the multiple cameras;

selecting the images containing the target person collected by the at least two cameras according to the corresponding relationship of the target person under the multiple cameras.

In the embodiment, there are at least two cameras arranged in a scene in advance, and each camera has a different viewing angle. Human body activities in the scene can be tracked and recognized through these cameras, and the corresponding relationship between the target person and the multiple cameras can be obtained by person re-identification ReID, so that the image of the target person is obtained, which improves accuracy in the tracking of the target person.

In a possible design, the determining a coordinate of a target person in a three-dimensional space according to images containing the target person collected by at least two cameras, includes:

selecting images containing the target person collected by any two cameras at the same time;

acquiring coordinates of the target person in the images containing the target person collected by the two cameras respectively, as well as camera matrices of the two cameras, where the camera matrices are acquired according to known camera parameters; and obtaining the coordinate of the target person in the three-dimensional space according to the coordinates of the target person in the images and the camera matrices of the two cameras.

In the embodiment, the coordinate of the target person in the three-dimensional space can be accurately converted from the coordinates of the target person in the images of the target person and the camera matrices of the two cameras.

In a possible design, obtaining the coordinate of the target person in the three-dimensional space according to the coordinates of the target person in the images and the camera matrices of the two cameras, includes:

assuming that $X_1$ and $X_2$ are the coordinates of the target person in the images under the two cameras, $P_1$ is a camera matrix of a camera corresponding to $X_1$, $P_2$ is a camera matrix of a camera corresponding to $X_2$; then a corresponding relationship between $X_1$, $X_2$ and the coordinate W of the target person in the three-dimensional space is as follows:

$$X_1 = P_1 * W, X_2 = P_2 * W;$$

where * represents an operation of multiplication.

In a possible design, calculating the back-projection errors of the target person under different cameras respectively according to the coordinate of the target person in the three-dimensional space, includes:

letting $U_i = P_i * W;$ where $U_i$ is a back-projection coordinate of W under an i-th camera, and $P_i$ is the camera matrix of the i-th camera, i=1, 2, 3 . . . N, and N is an amount of cameras that have collected images containing the target person;

letting $e_i=U_i-X_i$;

where, $e_i$ is the back-projection error of the i-th camera, $X_i$ is the coordinate of the target person in the image corresponding to the i-th camera, i=1, 2, 3 . . . N, and N is the amount of the cameras that have collected images containing the target person.

In the embodiment, the back-projection coordinate of the coordinate in the three-dimensional space in the images collected by the cameras may be calculated according to the coordinate in the three-dimensional space and the camera matrices of the cameras, and the back-projection errors corresponding to the coordinate in the three-dimensional space may be calculated accurately by performing a subtraction operation on the back-projection coordinates and corresponding coordinates (obtained by a current algorithm for coordinates in two-dimensional images) in the images collected by the cameras.

In a possible design, determining whether the camera has a human body recognition error according to the back-projection error of the camera, includes:

determining that the camera has the human body recognition error if the back-projection error of the camera is greater than the preset threshold.

In the embodiment, a human body recognition result may be assessed by utilizing the back-projection errors to make the human body recognition more accurate.

In a possible design, after performing re-recognition of the target person under the camera by using the person re-identification ReID until the back-projection errors of all the cameras containing the target person are not greater than a preset threshold, further include:

acquiring the coordinates of the target person in the images corresponding to the different cameras, and image tags; and sending the coordinates and the image tags to a monitoring platform.

In the present embodiment, the acquired coordinates of the target person in the images corresponding to the different cameras and the image tags may be sent to the monitoring platform, so that the monitoring platform can monitor the target person accurately.

In a second aspect, the present disclosure provides a human body recognition apparatus, including:

a determining module, configured to determine a coordinate of a target person in a three-dimensional space according to images containing the target person collected by at least two cameras;

a calculating module, configured to calculate back-projection errors of the target person under different cameras according to the coordinate of the target person in the three-dimensional space;

a deciding module, configured to determine, for each camera, whether the camera has a human body recognition error according to a back-projection error of the camera;

a recognizing module, configured to performing re-recognition of the target person under the camera by using person re-identification ReID when the camera has the human body recognition error, until the back-projection errors of all the cameras containing the target person are not greater than a preset threshold.

In a possible design, further include:

a pre-recognizing module, configured to perform human body recognition on images collected by multiple cameras by using the person re-identification ReID to obtain a corresponding relationship of the target person under the multiple cameras, before the determining of the coordinate of the target person in the three-dimensional space according to the images containing the target person collected by at least two cameras;

select the images containing the target person collected by the at least two cameras according to the corresponding relationship of target person under the multiple cameras.

In a possible design, the determining module is specifically configured to:

select images containing the target person collected by any two cameras at the same time;

acquire coordinates of the target person in the images collected by the two cameras respectively, as well as camera matrices of the two cameras, where the camera matrices are acquired according to known camera parameters;

obtain the coordinate of the target person in the three-dimensional space according to the coordinates of the target person in the images and the camera matrices of the two cameras.

In a possible design, obtaining the coordinate of the target person in the three-dimensional space according to the coordinates of the target person in the images and the camera matrices of the two cameras, includes:

assuming that $X_1$ and $X_2$ are coordinates of the target person in the images under the two cameras, $P_1$ is a camera matrix of a camera corresponding to $X_1$, $P_2$ is a camera matrix of a camera corresponding to $X_2$, then a corresponding relationship between $X_1$, $X_2$ and the coordinate W of the target person in the three-dimensional space is as follows:

$$X_1=P_1*W, X_2=P_2*W;$$

where, * represents an operation of multiplication.

In a possible design, calculating the back-projection errors of the target person under different cameras respectively according to the coordinate of the target person in the three-dimensional space, includes:

letting $U_i=P_i*W$;

where $U_i$ is a back-projection coordinate of W under an i-th camera, and $P_i$ is a camera matrix of the i-th camera, i=1, 2, 3 . . . N and N is an amount of cameras that have collected images containing the target person;

letting $e_i=U_i-X_i$;

where $e_i$ is the back-projection error of the i-th camera, $X_i$ is the coordinate of the target person in the image corresponding to the i-th camera, i=1, 2, 3 . . . N and N is the amount of the cameras that have collected images containing the target person.

In a possible design, the deciding module is specifically configured to:

determining that the camera has the human body recognition error if the back-projection error is greater than the preset threshold.

In a possible design, further include:

a sending module, configured to acquire coordinates of the target person in images corresponding to different cameras and image tags, after performing re-recognition of the target person under the camera by using person re-identification ReID, until the back-projection errors of all the cameras containing the target person are not greater than a preset threshold; and send the coordinates and the image tags to a monitoring platform.

In a third aspect, the present disclosure provides a server, including: a processor and a memory, the memory is stored with executable instructions of the processor; where the processor is configured to execute the human body recognition method according to any one of the first aspect by executing the executable instructions.

In a forth aspect, the present disclosure provide a computer readable storage medium, on which a computer program is stored, the human body recognition method according to any one of the first aspect can be implemented when the computer program is executed by a processor.

The human body recognition method and apparatus, and the storage medium provided by the present disclosure determine a coordinate of a target person in a three-dimensional space according to images containing the target person collected by at least two cameras; calculate back-projection errors of the target person under different cameras respectively according to the coordinate of the target person in the three-dimensional space; determine whether the cameras have a human body recognition error according to the back-projection errors of the cameras; when a camera has the human body recognition errors, re-recognize the target person under the camera by using person re-identification ReID, until the back-projection errors of all the cameras containing the target person are not greater than a preset threshold. The present disclosure can introduce the three-dimensional spatial coordinate of the human body into the human body re-recognition technology to prejudge the recognition result of the images and re-recognize the images with the recognition error, thereby effectively improving the accuracy of the human recognition result.

BRIEF DESCRIPTION OF DRAWINGS

In order to explain the embodiments of the present disclosure or technical solutions in the prior art more clearly, the drawings used in the description of the embodiments or the prior art will be briefly introduced below. Obviously, the drawings described in the following are some embodiments of the present disclosure, and for those of ordinary skill in the art, other drawings can be obtained based on these drawings without creative efforts.

DESCRIPTION OF EMBODIMENTS

In order to make objectives, technical solutions and advantages of embodiments of the present disclosure clearer, the technical solutions in the embodiments of the present disclosure will be clearly and completely described with reference to accompanying drawings in the embodiments of the present disclosure. Obviously, the embodiments described are part of the embodiments of the present disclosure, but not all the embodiments. All other embodiments based on the embodiments of the present disclosure, obtained by those skilled in the art without creative efforts shall fall within the protection scope of the present disclosure.

The terms "first", "second", "third", "fourth" and the like (if present) in the description and claims of the present disclosure as well as the above-mentioned drawings are used to distinguish similar objects, and do not need to be used for describing a particular order or sequence. It should be understood that data used in this way is interchangeable where appropriately, so that the embodiments of the disclosure described herein can be implemented in, for example, an order other than those illustrated or described herein. Furthermore, the terms "including" and "comprising" and any of their variations are intended to cover non-exclusive inclusions, for example, a process, method, system, product or device that contains a series of steps or units need not be limited to those clearly listed, but may include other steps or units that are not clearly listed or inherent to these processes, methods, products or devices.

The technical solutions of the present disclosure will be described in detail in the following specific examples. The following specific embodiments may be combined with each other, and same or similar concepts or processes may not be repeated in some embodiments.

In the following, some terms in this disclosure are explained to facilitate understanding of those skilled in the art:

1) Person re-identification (ReID) is a technology that decides whether there is a specific person in an image or a video sequence by using the computer visual technology. It is commonly considered as a subproblem of image retrieving. When an image of a person to be monitored is given, the images of the person need to be retrieved across devices. It aims at supplementing a current visual limitation of fixed cameras, and it may be combined with person detecting/person tracking technology, and can be widely applied into the field of intelligent video surveillance, intelligent security and so forth.

Figure 1:
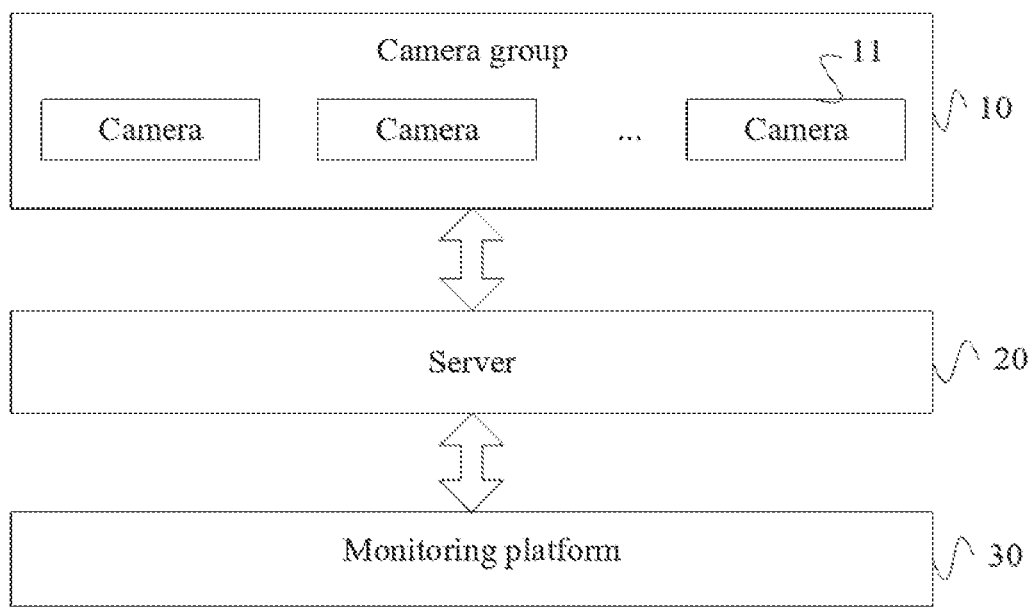
FIG. 1 is a schematic structural diagram of an application scenario of the present disclosure.

There are multiple cameras arranged in a scene in advance, and the multiple cameras can monitor human body activities from different viewing angles. Specifically, FIG. 1 is a schematic structural diagram of an application scenario of the present disclosure. As shown in FIG. 1, all the cameras in the scene form a camera group 10, different cameras 11 in the camera group 10 send images of a target person that are collected to a server 20, and the server 20 determines a coordinate of the target person in a three-dimensional space according to the images containing the target person collected by at least two cameras. The three-dimensional space in the present embodiment refers to the space in the scene. The server 20 calculates back-projection errors of the target person under the different cameras 11 according to the coordinate of the target person in the three-dimensional space; determines whether the cameras 11 have a human body recognition error according to the back-projection errors of the cameras 11; when a camera has the human recognition error, person re-identification ReID may be used to perform re-recognition of the target person under the camera 11 until the back-projection errors of all the cameras 11 containing the target person are not greater than a preset threshold. The server 20 sends the final recognized coordinates of the target person in the images corresponding to different cameras and image tags to a monitoring platform 30. The present embodiment can introduce the three-dimensional spatial coordinate of a human body into the human body re-recognition technology to prejudge the recognition result of the images and re-recognize the images with the recognition error, thereby effectively improving the accuracy of the human body recognition result.

The following specifically describes the technical solutions of the present disclosure and how the technical solutions of the present disclosure solve the above technical problems with specific embodiments. The following specific embodiments may be combined with each other, and the same or similar concepts or processes may not be repeated in some embodiments. The embodiments of the present disclosure will be described below with reference to the drawings.

Figure 2:
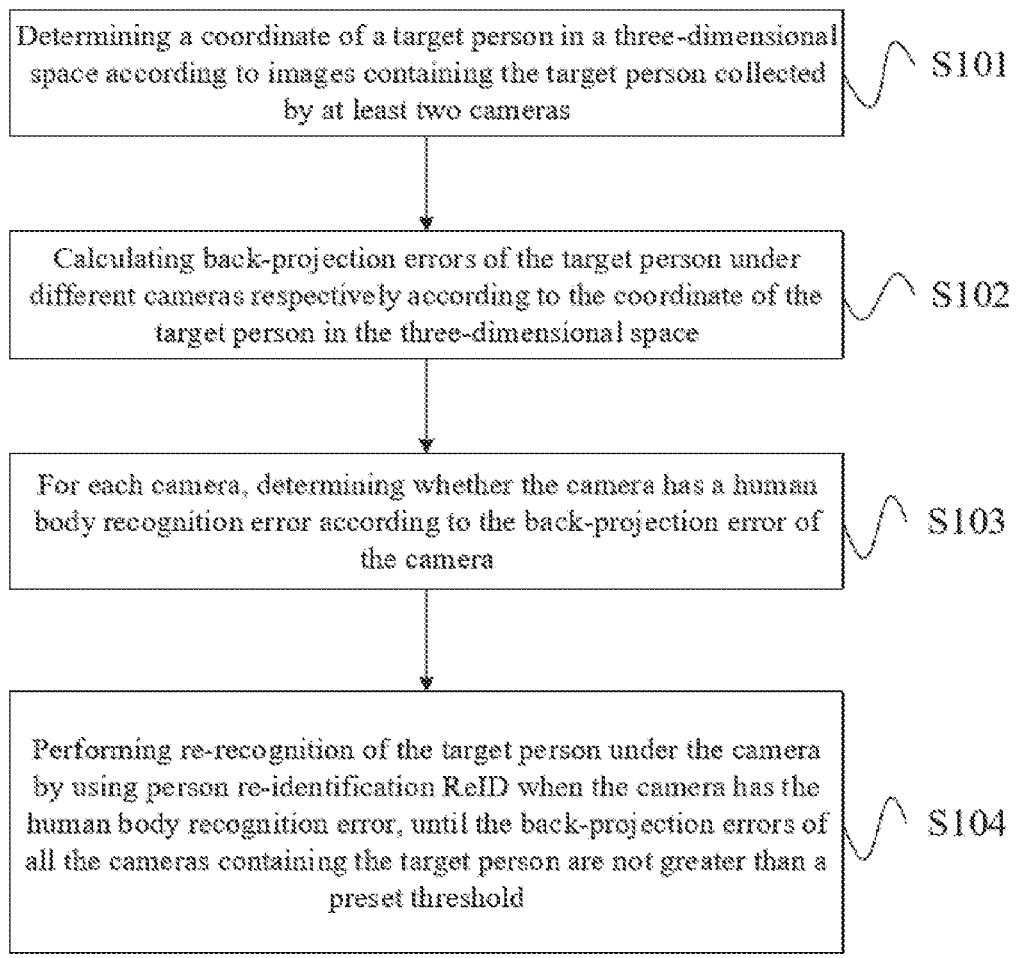
FIG. 2 is a flowchart of a human body recognition method provided by a first embodiment of the present disclosure.

FIG. 2 is a flowchart of a human body recognition method provided by a first embodiment of the present disclosure. As shown in FIG. 2, the method in the present embodiment may include:

S101, determining a coordinate of a target person in a three-dimensional space according to images containing the target person collected by at least two cameras.

In an optional implementation, the images containing the target person collected by any two cameras at the same time may be selected; the coordinates of the target person in the images containing the target person collected by the two cameras may be acquired respectively, as well as camera matrices of the two cameras, where the camera matrices are acquired according to known camera parameters; and the coordinate of the target person in the three-dimensional space may be acquired according to the coordinates of the target person in the images and the camera matrices of the two cameras.

In the present embodiment, multiple cameras are arranged in the scene in advance, and each camera has a different viewing angel. the human body activities in the scene may be tracked and recognized through these cameras. In an optional implementation, the images collected by the multiple cameras in the scene may be performed with human body recognition by using person re-identification ReID to obtain a corresponding relationship of the target person under the multiple cameras; and the images containing the target person collected by at least two cameras may be selected according to the corresponding relationship of the target person under the multiple cameras.

Specifically, assuming that $X_1$ and $X_2$ are coordinates of the target person in the images under two cameras, $P_1$ is the camera matrix of the camera corresponding to the $X_1$, $P_2$ is the camera matrix of the camera corresponding to the $X_2$; then a corresponding relationship between $X_1$, $X_2$ and the coordinate W of the target person in the three-dimensional space is as follows:

$$X_1 = P_1 * W, X_2 = P_2 * W;$$

where, * represents an operation of multiplication.

S102, calculating back-projection errors of the target person under different cameras, respectively, according to the coordinate of the target person in the three-dimensional space.

In the present embodiment, a back-projection coordinate of the coordinate in the three-dimensional space in an image collected by a camera may be calculated according to the coordinate in the three-dimensional space and the camera matrix of the camera, and a corresponding back-projection error may be obtained by performing a subtraction operation between the back-projection coordinate and the corresponding coordinate (obtained by a current algorithm for two-dimensional images) in the image collected by the camera.

In an optional implementation, assuming that the coordinate W of the target person in the three-dimensional space is obtained, then letting $U_i = P_i * W;$ where $U_i$ is the back-projection coordinate of W under the i-th camera, and $P_i$ is the camera matrix of the i-th camera, i=1, 2, 3 . . . N and N is an amount of the cameras that have collected images containing the target person;

letting $e_i = U_i - X_i;$ where $e_i$ is the back-projection error of the i-th camera, $X_i$ is the coordinate of the target person in the image corresponding to the i-th camera, i=1, 2, 3 . . . N and N is the amount of the cameras that have collected images containing the target person.

S103, for each camera, determining whether the camera has a human body recognition error according to the back-projection error of the camera.

In the present embodiment, whether an image corresponding to the camera has a human body recognition error may be determined through a value of the back-projection error. In an optional implementation, if the back-projection error of a certain camera is greater than a preset threshold, then it is determined that the camera has the human body recognition error. If the back-projection error of the certain camera is not greater than the preset threshold, then it is determined that the human body recognition result of the camera is correct.

S104, when the camera has the human body recognition error, perform re-recognition of the target person under the camera by using person re-identification ReID until the back-projection errors of all the cameras containing the target person are not greater than a preset threshold.

In the present embodiment, the current person re-identification ReID may be used to re-recognize the target person under the camera with the human body recognition error, thereby excluding an erroneous recognition result effectively, and improving accuracy of the human body recognition.

In an optional implementation, after performing re-recognition of the target person under the camera by using the person re-identification ReID until the back-projection errors of the cameras containing the target person are not greater than a preset threshold, the coordinates of the target person in the images corresponding to different cameras may be acquired at last, as well as image tags; and the coordinates and the image tags are sent to a monitoring platform.

In the present embodiment, the coordinate of the target person in the three-dimensional space may be determined according to the images containing the target person collected by at least two cameras, the back-projection errors of the target person under different cameras may be determined according to the coordinate of the target person in the three-dimensional space; whether the cameras have a human body recognition error may be determined according to the back-projection errors of the cameras; and when a camera has the human body recognition error, the person re-identification ReID may be used to re-recognize the target person under the camera with the human body recognition error until the back-projection errors of all the cameras containing the target person are not greater than the preset threshold. The present disclosure can introduce the three-dimensional spatial coordinate of the human body into the human body re-recognition technology to prejudge the recognition result of the images and re-recognize the image with the recognition error, thereby effectively improving the accuracy of the human recognition result.

Figure 3:
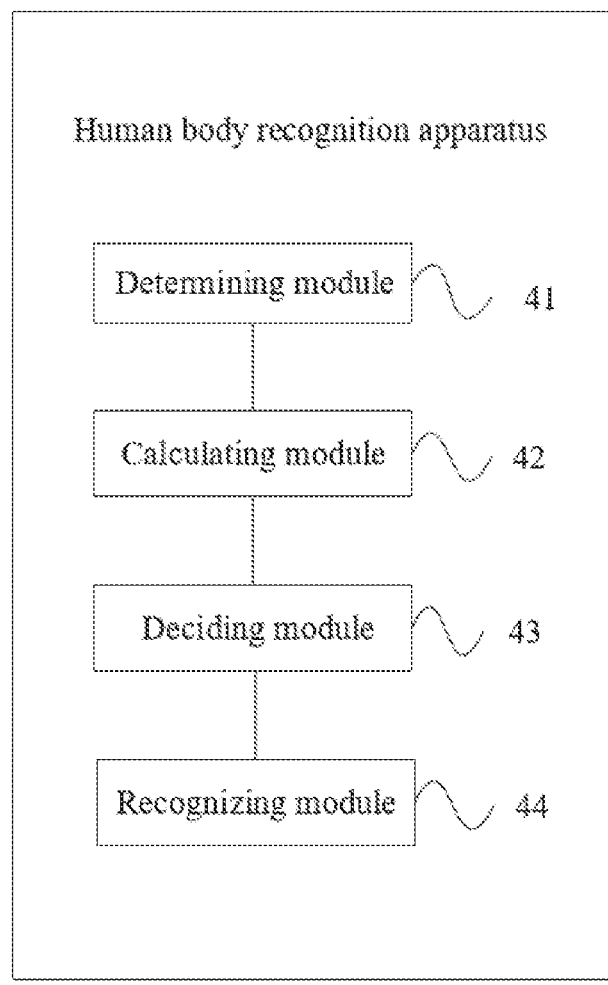
FIG. 3 is a schematic structural diagram of a human body recognition apparatus provided by a second embodiment of the present disclosure.

FIG. 3 is a schematic structural diagram of a human body recognition apparatus provided by a second embodiment of the present disclosure. As shown in FIG. 3, the human body recognition apparatus in the present embodiment may include:

a determining module 41, configured to determine a coordinate of a target person in a three-dimensional space according to images containing the target person collected by at least two cameras;

a calculating module 42, configured to calculate back-projection errors of the target person under different cameras according to the coordinate of the target person in the three-dimensional space;

a deciding module 43, configured to determine, for each camera, whether the camera has a human body recognition error according to a back-projection error of the camera;

a recognizing module 44, configured to, perform, when the camera has the human body recognition error, re-recognition of the target person under the camera by using person re-identification ReID, until the back-projection errors of all the cameras containing the target person are not greater than a preset threshold.

In a possible design, the determining module 41 is specifically configured to:

select images containing the target person collected by any two cameras at the same time;

acquire coordinates of the target person in the images containing the target person collected by the two cameras respectively, as well as camera matrices of the two camera, where the camera matrices are acquired according to known camera parameters;

obtain the coordinate of the target person in the three-dimensional according to the coordinates of the target person in the images and the camera matrices of the two cameras.

In a possible design, obtaining the coordinate of the target person in the three-dimensional space according to the coordinates of the target person in the images and the camera matrices of the two cameras, includes:

assuming that $X_1$ and $X_2$ are coordinates of the target person in the images under the two cameras, $P_1$ is the camera matrix of the camera corresponding to $X_1$, $P_2$ is the camera matrix of the camera corresponding to $X_2$; then a corresponding relationship between $X_1$, $X_2$ and the coordinate W of the target person in the three-dimensional space is as follows:

$$X_1 = P_1 * W, X_2 = P_2 * W;$$

where, * represents an operation of multiplication.

In a possible design, calculating the back-projection errors of the target person under different cameras respectively according to the coordinate of the target person in the three-dimensional space, includes:

letting $U_i = P_i * W;$ where $U_i$ is the back-projection coordinate of W under the i-th camera, and $P_i$ is the camera matrix of the i-th camera, i=1, 2, 3 . . . N, and N is an amount of cameras that have collected images containing the target person;

letting $e_i = U_i - X_i;$ where $e_i$ is the back-projection error of the i-th camera, $X_i$ is the coordinate of the target person in the image corresponding to the i-th camera, i=1, 2, 3 . . . N and N is the amount of the cameras that have collected images containing the target person.

In a possible design, the deciding module 43 is specifically configured to:

determine that the camera has the human body recognition error, if the back-projection of the camera is greater than the preset threshold.

The human body recognition apparatus provided by the present embodiment can execute the technical solution in the method of any of the method embodiments described above, the implementation principles and technical effects thereof are similar and will not be detailed herein.

Figure 4:
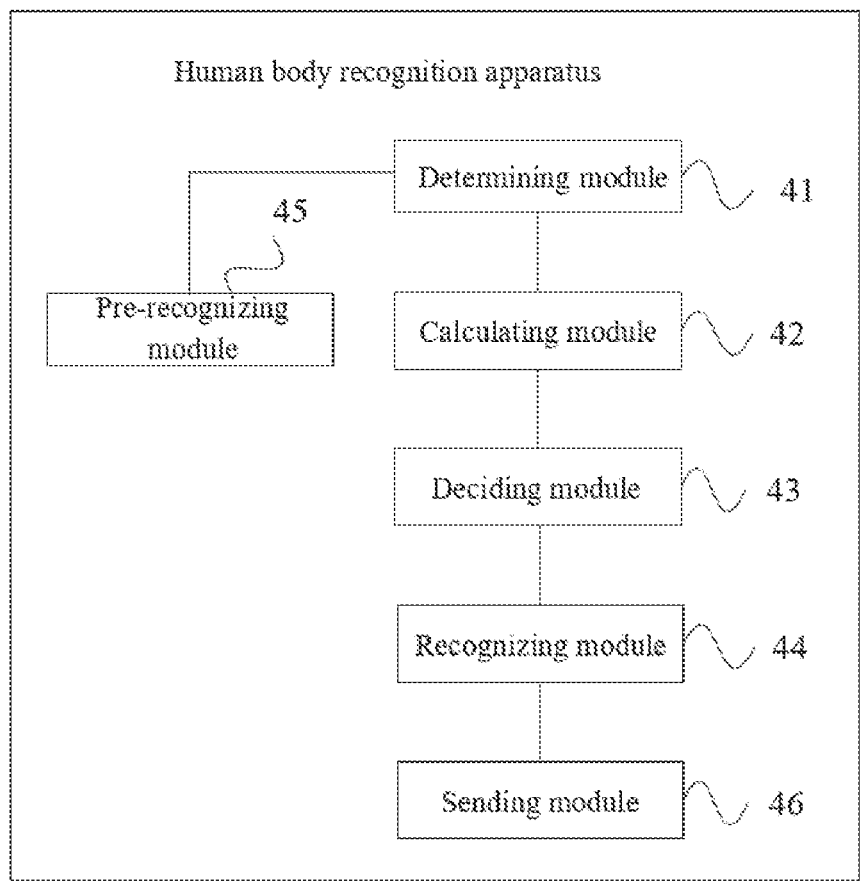
FIG. 4 is a schematic structural diagram of a human body recognition apparatus provided by a third embodiment of the present disclosure.

FIG. 4 is a schematic structural diagram of a human body recognition apparatus provided by a third embodiment of the present disclosure. As shown in FIG. 4, on the basis of the apparatus shown in FIG. 3, the human body recognition apparatus in the present embodiment may further include:

a pre-recognizing module 45, configured to perform human body recognition on images collected by multiple cameras in a scene by using the person re-identification ReID to obtain a corresponding relationship of the target person under the multiple cameras, before the determining of the coordinate of the target person in the three-dimensional space according to the images containing the target person collected by the at least two cameras;

select images containing the target person collected by the at least two cameras according to the corresponding relationship of target person under the multiple cameras.

In a possible design, further include:

a sending module 46, configured to acquire the coordinates of the target person in the images corresponding to different cameras, and image tags, after the performing of the re-recognition of the target person under the camera by using the person re-identification ReID, until the back-projection errors of all the cameras containing the target person are not greater than a preset threshold; and send the coordinates and the image tags to a monitoring platform.

The human body recognition apparatus of the present embodiment can execute the technical solution in the method of any of the method embodiments, the implementation principles and technical effects thereof are similar, and will not be detailed herein.

Figure 5:
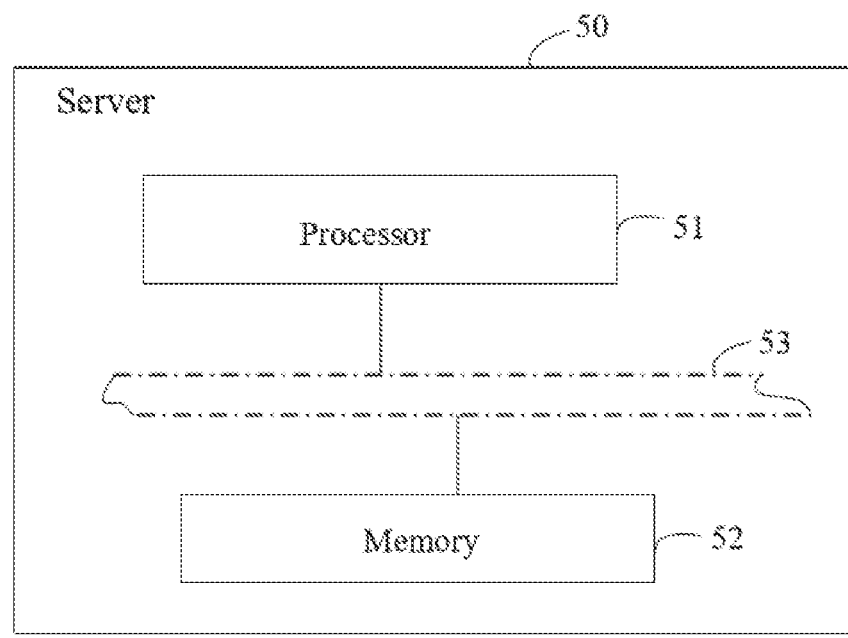
FIG. 5 is a server provided by a fourth embodiment of the present disclosure.

FIG. 5 is a server provided by a fourth embodiment of the present disclosure. As shown in FIG. 5, the server 50 in the present embodiment includes: a processor 51 and a memory 52.

The memory 52 is configured to store a computer program (such as an application program, a functional module and the like that implements the foregoing human body recognition method), computer instructions and the like, the computer program, the computer instructions and the like may be stored in partitions in one or more memories 52. And the computer program, computer instructions, data and the like that are mentioned above can be called by the processor 51.

The processor 51 is configured to execute the computer program stored in the memory 52 to implement the steps in the method according to the foregoing embodiment. For the details, reference may be made to related descriptions in the foregoing method embodiments. The memory 52 and the processor 51 may be coupled and connected through a bus 53.

The server in the present embodiment may execute the technical solution in the method of any of the foregoing method embodiments. The implementation principles and technical effects thereof are similar, and are not detailed herein.

In addition, an embodiment of the present disclosure further provides a computer readable storage medium. The computer readable storage medium stores computer executable instructions. A user equipment can executes the various possible foregoing methods, when at least one processor of the user equipment executes the computer execution instructions.

The computer readable medium includes a computer storage medium and a communication medium, where the communication medium includes any medium that facilitates transfer of a computer program from one place to another. The storage media may be any available medium that can be accessed by a general purpose or special purpose computer. An exemplary storage medium is coupled to the processor such that the processor can read information from the storage medium, and write information to the storage medium. Of course, the storage medium may also be a component of the processor. The processor and the storage medium may reside in an ASIC. In addition, the ASIC may reside in the user equipment. Of course, the processor and the storage medium may also exist as discrete components in a communication device.

Those skilled in the art may understand that all or part of the steps for implementing the foregoing method embodiments may be implemented by hardware related to program instructions. The foregoing program may be stored in a computer-readable storage medium. When the program is executed, the steps containing the foregoing method embodiments are executed; and the foregoing storage medium includes: various media that can store program codes, such as a ROM, a RAM, a magnetic disk, or an optical disc and the like.

Finally, it should be noted that the above embodiments are only used to explain the technical solutions of the present disclosure, but not to limit; although the disclosure has been described in detail with reference to the above embodiments, those skilled in the art should understand that they can still modify the technical solutions recorded in the above embodiments, or equivalently replace some or all of the technical features. However, these modifications or replacements do not deviate the essence of the corresponding technical solutions from the scope of technical solutions of the embodiments of the present disclosure.

What is claimed is:

1. A human body recognition method, comprising:
   determining a coordinate of a target person in a three-dimensional space according to images containing the target person collected by at least two cameras;
   calculating back-projection errors of the target person under different cameras, respectively, according to the coordinate of the target person in the three-dimensional space;
   for each camera, determining whether the camera has a human body recognition error according to a back-projection error of the camera;
   performing, when the camera has the human body recognition error, performing re-recognition of the target person under the camera by using person re-identification (ReID), until the back-projection errors of all the cameras containing the target person are not greater than a preset threshold;
   wherein the determining a coordinate of a target person in a three-dimensional space according to images containing the target person collected by at least two cameras, comprises:
   selecting images containing the target person collected by any two cameras at the same time;
   acquiring coordinates of the target person in the images collected by the two cameras respectively, as well as camera matrices of the two cameras, wherein the camera matrices are acquired according to known camera parameters;
   obtaining the coordinate of the target person in the three-dimensional space according to the coordinates of the target person in the images and the camera matrices of the two cameras;
   wherein the obtaining the coordinate of the target person in the three-dimensional space according to the coordinates of the target person in the images and the camera matrices of the two cameras, comprises:
   assuming that X1 and X2 are the coordinates of the target person in the images under the two cameras, P1 is a camera matrix of a camera corresponding to X1, P2 is a camera matrix of a camera corresponding to X2; then a corresponding relationship between X1, X2 and the coordinate W of the target person in the three-dimensional space is as follows:

$$X1=P1*W, X2=P2*W;$$

wherein, * represents an operation of multiplication.

2. The method according to claim 1, wherein before the determining a coordinate of a target person in a three-dimensional space according to images containing the target person collected by at least two cameras, the method further comprises:
   performing human body recognition on images collected by multiple cameras in a scene by using the person re-identification (ReID), to obtain a corresponding relationship of the target person under the multiple cameras;
   selecting the images containing the target person collected by the at least two cameras according to the corresponding relationship of the target person under the multiple cameras.

3. The method according to claim 1, wherein the calculating back-projection errors of the target person under different cameras respectively according to the coordinate of the target person in the three-dimensional space, comprises:

letting $Ui=Pi*W$;

wherein Ui is a back-projection coordinate of W under an i-th camera, and Pi is a camera matrix of the i-th camera, i=1, 2, 3 ... N, and N is an amount of cameras that have collected images containing the target person;

letting $ei=Ui-Xi$;

wherein ei is the back-projection error of the i-th camera, Xi is the coordinate of the target person in the image corresponding to the i-th camera, i=1, 2, 3 ... N, and N is the amount of the cameras that have collected images containing the target person.

4. The method according to claim 1, wherein the determining whether the camera has a human body recognition error according to a back-projection error of the camera, comprises:
   determining that the camera has the human body recognition error, if the back-projection error of the camera is greater than the preset threshold.

5. The method according to claim 1, wherein after the performing re-recognition of the target person under the camera by using person re-identification (ReID) until the back-projection errors of all the cameras containing the target person are not greater than a preset threshold, the method further comprises:
   acquiring coordinates of the target person in images corresponding to the different cameras, and image tags;

sending the coordinates and the image tags to a monitoring platform.

6. A human body recognition apparatus, comprising:
a processor and a memory, the memory storing executable instructions of the processor, wherein the processor is configured to:
determine a coordinate of a target person in a three-dimensional space according to images containing the target person collected by at least two cameras;
calculate back-projection errors of the target person under different cameras according to the coordinate of the target person in the three-dimensional space;
determine, for each camera, whether the camera has a human body recognition error according to a back-projection error of the camera;
perform, when the camera has the human body recognition error, re-recognition of the target person under the camera by using person re-identification (ReID), until the back-projection errors of all the cameras containing the target person are not greater than a preset threshold;
wherein the processor is configured to:
select images containing the target person collected by any two cameras at the same time;
acquire coordinates of the target person in the images collected by the two cameras respectively, as well as camera matrices of the two cameras, wherein the camera matrices are acquired according to known camera parameters;
obtain the coordinate of the target person in the three-dimensional space according to the coordinates of the target person in the images and the camera matrices of the two cameras;
wherein the obtain the coordinate of the target person in the three-dimensional space according to the coordinates of the target person in the images and the camera matrices of the two cameras, comprises:
assuming that X1 and X2 are the coordinates of the target person in the images under the two cameras, P1 is a camera matrix of a camera corresponding to X1, P2 is a camera matrix of a camera corresponding to X2; then a corresponding relationship between X1, X2 and the coordinate W of the target person in the three-dimensional space is as follows:

$$X1=P1*W, X2=P2*W;$$

wherein, * represents an operation of multiplication.

7. The apparatus according to claim 6, wherein the processor is further configured to:
perform human body recognition on images collected by multiple cameras in a scene by using the person re-identification (ReID) to obtain a corresponding relationship of the target person under the multiple cameras, before the determining of the coordinate of the target person in the three-dimensional space according to the images containing the target person collected by the at least two cameras;
select the images containing the target person collected by the at least two cameras according to the corresponding relationship of the target person under the multiple cameras.

8. The apparatus according to claim 6, wherein the calculating back-projection errors of the target person under different cameras respectively according to the coordinate of the target person in the three-dimensional space, comprises:

letting $Ui=Pi*W$;

wherein Ui is a back-projection coordinate of W under an i-th camera, and Pi is the camera matrix of the i-th camera, i=1, 2, 3 ... N and N is an amount of cameras that have collected images containing the target person;

letting $ei=Ui-Xi$;

wherein ei is the back-projection error of the i-th camera, Xi is the coordinate of the target person in the image corresponding to the i-th camera, i=1, 2, 3 ... N, and N is the amount of the cameras that have collected images containing the target person.

9. The apparatus according to claim 6, wherein the processor is configured to:
determine that the camera has the human body recognition error, if the back-projection error of the camera is greater than the preset threshold.

10. The apparatus according to claim 6, wherein the processor is further configured to:
acquire coordinates of the target person in images corresponding to different cameras and image tags, after the performing of the re-recognition of the target person under the camera by using the person re-identification (ReID) until the back-projection errors of all the cameras containing the target person are not greater than the preset threshold; and
send the coordinates and the image tags to a monitoring platform.

11. A non-transitory computer readable storage medium, on which a computer program is stored, wherein the human body recognition method according to claim 1 is implemented when the computer program is executed by a processor.

* * * * *